US007917149B2

(12) United States Patent
Chen et al.

(10) Patent No.: US 7,917,149 B2
(45) Date of Patent: Mar. 29, 2011

(54) SYSTEM AND METHOD FOR REUSING WIRELESS RESOURCES IN A WIRELESS NETWORK

(75) Inventors: Wei-Peng Chen, Santa Clara, CA (US);
Chenxi Zhu, Gaithersburg, MD (US);
Ching-Fong Su, Milpitas, CA (US);
Jonathan R. Agre, Brinklow, MD (US)

(73) Assignee: Fujitsu Limited, Kawasaki (JP)

( * ) Notice: Subject to any disclaimer, the term of this patent is extended or adjusted under 35 U.S.C. 154(b) by 149 days.

(21) Appl. No.: 11/557,428

(22) Filed: Nov. 7, 2006

(65) Prior Publication Data
US 2008/0045139 A1   Feb. 21, 2008

Related U.S. Application Data

(60) Provisional application No. 60/822,861, filed on Aug. 18, 2006.

(51) Int. Cl.
*H04W 72/00* (2009.01)
(52) U.S. Cl. ............... 455/450; 455/451; 455/452.1; 455/509; 455/512; 455/7; 455/9; 455/11.1; 455/13.1; 455/63.1; 455/67.13; 455/443
(58) Field of Classification Search ............ 455/450, 455/451, 452.1, 452.2, 453, 436–444, 446, 455/328, 329, 330, 331, 332, 333, 335, 336, 455/338, 351, 7, 11.1, 13.1, 447, 449, 455, 455/464, 509, 512, 513, 514, 516, 517, 63.1, 455/67.13; 450/7, 11.1, 13.1, 63.1, 67.13, 450/450, 451, 452.1, 452.2, 446–449, 509, 450/512, 513, 516
See application file for complete search history.

(56) References Cited

U.S. PATENT DOCUMENTS

| 4,736,453 | A | * | 4/1988 | Schloemer | 455/450 |
|---|---|---|---|---|---|
| 5,239,666 | A | * | 8/1993 | Truby | 455/9 |
| 5,771,454 | A | * | 6/1998 | Ohsawa | 455/452.2 |
| 5,839,074 | A | * | 11/1998 | Plehn | 455/450 |
| 6,219,541 | B1 | * | 4/2001 | Brodie | 455/451 |

(Continued)

FOREIGN PATENT DOCUMENTS
KR   2004-83040   10/2004
(Continued)

OTHER PUBLICATIONS

Jain, et al., *Impact of Interference on Multi-hop Wireless Network Performance*, downloaded from http://research.microsoft.com/mesh/paper/interference.pdf (14 pages).

(Continued)

*Primary Examiner* — Charles N Appiah
*Assistant Examiner* — Olumide T Ajibade-Akonai
(74) *Attorney, Agent, or Firm* — Baker Botts L.L.P.

(57) ABSTRACT

A method for reusing wireless resources in a wireless network, includes determining the probability of a first communication with a first relay station experiencing interference from a second relay station. The method also includes, upon determining that the probability of experiencing interference from the second relay station is greater than an interference threshold: allocating a first wireless resource to the first relay station and the second relay station; designating the first wireless resource as a primary wireless resource for the first relay station; designating the first wireless resource as a secondary wireless resource for the second relay station; allocating a second wireless resource to the second relay station; and designating the second wireless resource as a primary wireless resource for the second relay station.

35 Claims, 4 Drawing Sheets

U.S. PATENT DOCUMENTS

| | | | |
|---|---|---|---|
| 6,636,736 B1 * | 10/2003 | Billon | 455/447 |
| 6,718,158 B1 | 4/2004 | Suonvieri | 455/9 |
| 6,795,685 B2 * | 9/2004 | Walkup | 455/11.1 |
| 7,123,893 B1 * | 10/2006 | Austin et al. | 455/278.1 |
| 7,346,689 B1 | 3/2008 | Northcutt et al. | 709/227 |
| 2003/0095512 A1 * | 5/2003 | Hepsaydir | 370/320 |
| 2004/0121749 A1 | 6/2004 | Cui et al. | 455/226.1 |
| 2004/0203814 A1 * | 10/2004 | Ho et al. | 455/450 |
| 2004/0242158 A1 * | 12/2004 | Fattouch et al. | 455/63.1 |
| 2005/0014464 A1 | 1/2005 | Larsson | 455/11.1 |
| 2005/0085235 A1 | 4/2005 | Park et al. | 455/450 |
| 2005/0250499 A1 | 11/2005 | Lee et al. | 455/437 |
| 2006/0030309 A1 | 2/2006 | Lee et al. | 455/422.1 |
| 2006/0045094 A1 | 3/2006 | Yun et al. | 370/395.4 |
| 2006/0068823 A1 | 3/2006 | Kwon et al. | 455/517 |
| 2006/0073833 A1 * | 4/2006 | Hamalainen et al. | 455/447 |
| 2006/0121903 A1 | 6/2006 | Lee et al. | 455/439 |
| 2006/0193280 A1 * | 8/2006 | Lee et al. | 370/315 |
| 2007/0037576 A1 | 2/2007 | Subramanian et al. | 455/436 |
| 2007/0047569 A1 * | 3/2007 | Das et al. | 370/443 |
| 2007/0066241 A1 | 3/2007 | Hart | 455/69 |
| 2007/0086379 A1 | 4/2007 | Takayanagi et al. | 370/329 |
| 2007/0160020 A1 * | 7/2007 | Osann | 370/338 |
| 2007/0249347 A1 | 10/2007 | Saifullah et al. | 455/436 |
| 2007/0270118 A1 | 11/2007 | Subramanian et al. | 455/343.2 |
| 2008/0009243 A1 | 1/2008 | Hart | 455/67.13 |
| 2008/0031197 A1 * | 2/2008 | Wang et al. | 370/331 |
| 2008/0045139 A1 | 2/2008 | Chen et al. | 455/3.04 |
| 2008/0045215 A1 | 2/2008 | Chen et al. | 455/435.2 |

FOREIGN PATENT DOCUMENTS

| | | |
|---|---|---|
| WO | WO 97/07602 | 2/1997 |
| WO | WO 2005/067173 | 7/2005 |
| WO | WO 2006/034578 | 4/2006 |

OTHER PUBLICATIONS

IEEE 802.16 Presentation Submission Template (Rev. 8.3), downloaded from http://grouper.ieee.org/groups/802/16/relay/contrib/C80216j-06_004r1.pdf (14 pages).

*Industrial Technology Research Institute, 802.16j MMR Mobile Multi-Hop Relay*, tmlin@itri.org.tw (21 pages), Jun. 1, 2006.

Letter from Paul Nikolich to Jodi Haasz at International Stds Programs and Governance re *P802.16j—Amendment to IEEE Standard for Local and Metropolitan Area Networks*—Part 16: Air Interface for Fixed and Mobile Broadband Wireless Access Systems—Multihop Relay Specification (4 pages), Mar. 31, 2006.

Puthenkulam, et al., *802.16e: A Mobile Broadband Wireless Standard, Mobility Group*, Copyright © 2005 Intel Corporation (29 pages).

*IEEE 802 Tutorial: 802.16 Mobile Multihop Relay, IEEE WirelessMAN 802.16*, (73 pages), Mar. 6, 2006.

*IEEE Standard for Local and Metropolitan area networks*, Part 16: Air Interface for Fixed and Mobile Broadband Wireless Access Systems, Amendment 2, and Corrigendum 1 *IEEE* Copyright © 2006 IEEE. (822 pages).

U.S. Patent communication mailed Sep. 10, 2008 re U.S. Appl. No. 11/627,759, filed Jan. 26, 2007.

U.S. Patent communication mailed Jan. 9, 2009 re U.S. Appl. No. 11/627,759, filed Jan. 26, 2007.

Kipo's Notice of Preliminary Rejection (English translation) mailed Feb. 20, 2009 in re Korean Patent Application 10-2007-78631 (4 pages).

Kipo's Notice of Preliminary Rejection (English Translation) Office Action for Korean Patent Application No. 10-2007-77445, 4 pages, received Feb. 18, 2009.

Kipo's Notice of Preliminary Rejection (English Translation) Office Action for Korean Patent Application No. 10-2007-78631, received Aug. 24, 2009, referencing KR Pat. Appln. Pub. 2004-83040.

Chen et al., U.S. Appl. No. 11/549,892, *System and Method for Assigning Channels in a Wireless Network*, Communication from the Patent Office mailed Aug. 21, 2009.

Communication from State IP Office of the People's Republic of China, First Office Action issued on May 11, 2010 regarding Application #200710141989.8.

Yajian Liu et al, "On the Radio Resource Allocation in Enhanced Uplink ULTRA-FDD with Fixed Relay Stations," 2005 IEEE 16th International Symposium on Personal, Indoor and Mobile Radio Communications, pp. 1611-1615. 2005.

Communication with extended European search report from European Patent Office mailed Dec. 28, 2010 regarding Application 07113534.7-2412/1890433, Dec. 28, 2010.

* cited by examiner

SYSTEM AND METHOD FOR REUSING WIRELESS RESOURCES IN A WIRELESS NETWORK

RELATED APPLICATIONS

This application claims priority to U.S. Patent Application Ser. No. 60/822,861, entitled "MANAGING A WIRELESS NETWORK," which was filed on Aug. 18, 2006.

TECHNICAL FIELD OF THE INVENTION

This invention relates in general to communication systems and, more particularly, to a system and method for reusing wireless resources in a wireless network.

BACKGROUND OF THE INVENTION

While broadband network services and Voice over IP (VoIP) products continue to grow and expand, so does the demand for wireless network functionality. To help meet this demand networks are being developed that use multiple base stations, relay stations, access points or points of contact. One emerging technology is 802.16, popularly known as WiMAX. WiMAX provides broadband wireless access, with a single base station providing coverage over a large area (theoretically up to 31 miles). Other wireless networking technologies include Third Generation (3G), Third Generation Partnership Project (3GPP), and 802.11, popularly known as WiFi.

An endpoint's ability to enjoy the benefits of wireless networks, such as WiMAX, depends on its ability to locate and lock onto a strong enough signal. This can often be difficult in areas where the signal from the base station encounters interference (e.g., at the edge of its range, in areas where the coverage of two bases stations overlap, within a tunnel or building). One possible solution is to increase the transmission power of the base station; another solution is to install additional base stations. However, this may not be desirable because of the increased operating costs and the limited access to backhaul links. Another solution is 802.16j which is being developed by the 802.16j Relay Working Group as part of the 802.16 standard. 802.16j provides a way to implement relay stations that may increase the service area and/or throughput abilities of a WiMAX base station. The relay stations do not need a backhaul link because they communicate wirelessly with both base stations and endpoints. This type of network may be referred to as a multihop network because there may be more than one wireless connection between the endpoint and a hardwired connection.

As may be apparent, communicating wirelessly with both base stations and endpoints increases the amount of data that the relay station must communicate. More specifically, the relay station both receives and then transmits the same data between the endpoint and the base station using wireless connections. A relay station within the wireless network may often only use a single channel to provide its communication needs with both the endpoints and the other relay stations and base stations. The capacity of this channel is finite and in some situations may be insufficient to support the traffic demands within a particular relay station's cell.

SUMMARY

Particular embodiments provide a system and method for reusing wireless resources in a wireless network that substantially eliminates or reduces at least some of the disadvantages and problems associated with previous methods and systems.

In accordance with a particular embodiment, a method for reusing wireless resources in a wireless network includes determining the probability of a first communication with a first relay station experiencing interference from a second relay station. The method also includes, upon determining that the probability of experiencing interference from the second relay station is greater than an interference threshold: allocating a first wireless resource to the first relay station and the second relay station; designating the first wireless resource as a primary wireless resource for the first relay station; designating the first wireless resource as a secondary wireless resource for the second relay station; allocating a second wireless resource to the second relay station; and designating the second wireless resource as a primary wireless resource for the second relay station.

In particular embodiments the method may also include, upon determining that the probability of experiencing interference from the second relay station is less than an interference threshold: allocating a first wireless resource to the first relay station and the second relay station; and designating the first wireless resource as a primary wireless resource for the first relay station and the second relay station.

In some embodiments the first wireless resource and second wireless resource may include different bandwidths, frequencies, time slots, or subchannels.

In particular embodiments, determining the probability of the first communication with the first relay station experiencing interference from the second relay station includes constructing an interference matrix. A matrix entry in the interference matrix corresponding to the probability of the first communication with the first relay station experiencing interference from a second relay station may include a 1 if the probability of experiencing interference from the second relay station is greater than an interference threshold or it may include a 0 if the probability of experiencing interference from the second relay station is less than an interference threshold.

In accordance with another embodiment, a method for reusing wireless resources in a wireless network includes receiving from a base station a wireless resource designation message designating a first wireless resource to be used as a primary wireless resource and a second wireless resource to be used as a secondary wireless resource. The second wireless resource is also being used by a proximate relay station. The method also includes establishing a first wireless connection with an endpoint using the second wireless resource. The method further includes, upon detecting interference from the proximate relay station using the second wireless resource with the first wireless connection with the endpoint using the second wireless resource, establishing a second wireless connection with the endpoint using the primary wireless resource.

In some embodiments detecting interference from the proximate relay station with the first wireless connection with the endpoint using the second wireless resource may include receiving from the endpoint a first number of requests for retransmission within a first amount of time. In particular embodiments detecting interference from the proximate relay station with the first wireless connection with the endpoint using the second wireless resource may include sending the endpoint a request for a signal quality report and then receiving from the endpoint the signal quality report.

In accordance with another embodiment, a system for reusing wireless resources in a wireless network includes a processor operable to determine the probability of a first communication with a first relay station experiencing interference from a second relay station. The processor is further operable to, upon determining that the probability of experiencing interference from the second relay station is greater than an interference threshold: allocate a first wireless resource to the first relay station and the second relay station; designate the first wireless resource as a primary wireless resource for the first relay station; designate the first wireless resource as a secondary wireless resource for the second relay station; allocate a second wireless resource to the second relay station; and designate the second wireless resource as a primary wireless resource for the second relay station.

In accordance with another embodiment, a system for reusing resources in a wireless network includes an interface operable to receive from a base station a wireless resource designation message designating a first wireless resource to be used as a primary wireless resource and a second wireless resource to be used as a secondary wireless resource, the second wireless resource also being used by a proximate relay station. The system also includes a processor coupled to the interface and operable to establish a first wireless connection with an endpoint using the second wireless resource. The processor is further operable to, upon detecting interference from the proximate relay station using the second wireless resource with the first wireless connection with the endpoint using the second wireless resource, establish a second wireless connection with the endpoint using the primary wireless resource.

Technical advantages of particular embodiments include allowing a base station to assign wireless resources in such a manner that some relay stations may be using the same, or a portion of the same, wireless resource (e.g., some overlap in the center frequency, bandwidth, time slot, or subchannel (for example, as described in a downlink or uplink map) used by the two relay stations). Accordingly, in a wireless network comprising several relay stations, the base station may be able to increase the amount of wireless resources assigned to individual relay stations by allowing the wireless resources to be reused.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Figures 1, 3:
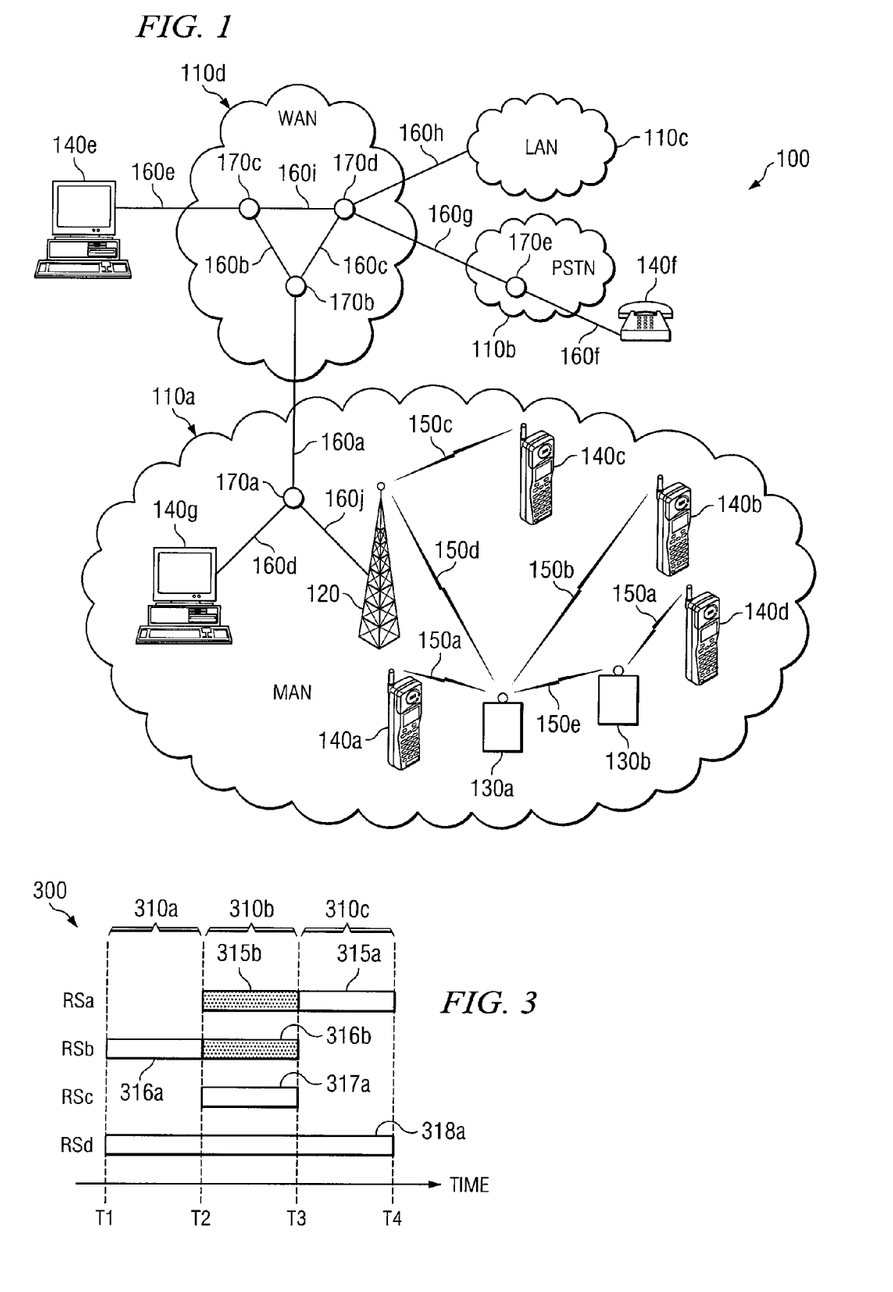
FIG. 1 illustrates a communication system comprising various communication networks, in accordance with a particular embodiment.
FIG. 3 illustrates a graphical representation of an allocation of wireless resources, in accordance with a particular embodiment.

FIG. 1 illustrates a communication system comprising various communication networks, in accordance with a particular embodiment. Communication system 100 may be comprised of multiple networks 110. Each network 110 may be any of a variety of communication networks designed to facilitate one or more different services either independently or in conjunction with other networks. For example, networks 110 may facilitate internet access, online gaming, file sharing, peer-to-peer file sharing (P2P), voice over internet protocol (VoIP) calls, video over IP calls, or any other type of functionality typically provided by a network. Networks 110 may provide their respective services using any of a variety of protocols for either wired or wireless communication. For example, network 110a may comprise an 802.16 wireless network, popularly known as WiMAX, which may include base stations (e.g., base station 120) and relay stations (e.g., relay stations 130). Network 110a may provide for the use of relay stations 130 by implementing 802.16j. A WiMAX network that uses relay stations may be referred to as a mobile multihop relay (MMR) network.

Each relay station and base station within network 110a may have one or more wireless resources allocated thereto for use in establishing wireless connections 150. A wireless resource may comprise, for example, a combination of a particular center frequency, a particular bandwidth, a particular time slot, and/or a particular subchannel (for example, as described in a downlink or uplink map). In particular embodiments, base station 120 may assign the same wireless resource, or a portion thereof, to multiple relay stations, effectively increasing the amount of wireless resources available within network 110a. Despite careful planning there may arise situations in which two or more relay stations have been assigned the same resource and are encountering interference. To avoid problems with this situation, base station 120 may assign one or both relay stations a primary wireless resource and a secondary wireless resource. The relay station may initially use the secondary resource assigned to it to communicate with the endpoints connected thereto. Then if a particular endpoint encounters interference, the relay station may switch to the primary wireless resource to communicate with the endpoint that experienced the interference. If any other relay stations were using the primary resource to which the endpoint was just moved and were causing interference, they would need to adjust their resources to allow the relay station and endpoint to have access to, and communicate over, the primary resource without interference. This allows for relay stations to be able to reuse wireless resources. However, should there be interference with the reused wireless resource, the relay stations still have access to a primary wireless resource which may provide interference free communication.

Although communication system 100 includes four networks 110a-110d, the term "network" should be interpreted as generally defining any network capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110d may be implemented as a LAN, WAN, MAN, PSTN, WiMAX network, global distributed network such as the Internet, Intranet, Extranet, or any other form of wireless or wired networking.

Generally, networks 110a, 110c, and 110d provide for the communication of packets, cells, frames, or other portions of information (generally referred to as packets herein) between endpoints 140 and/or nodes 170. Networks 110 may include any number and combination of wired links 160, wireless connections 150, nodes 170 and/or endpoints 140. For purposes of illustration and simplicity, network 110a is a MAN that may be implemented, at least in part, via WiMAX, network 110*b* is a PSTN, network 110*c* is a LAN, and network 110*d* is a WAN.

Networks 110*a*, 110*c* and 110*d* may be IP networks. IP networks transmit data by placing the data in packets and sending each packet individually to the selected destination, along one or more communication paths. Network 110*b* is a PSTN that may include switching stations, central offices, mobile telephone switching offices, pager switching offices, remote terminals, and other related telecommunications equipment that are located throughout the world. Network 110*d* may be coupled to network 110*b* through a gateway. Depending on the embodiment, the gateway may be a part of network 110*b* or 110*d* (e.g., nodes 170*e* or 170*c* may comprise a gateway). The gateway may allow PSTN 110*d* to be able to communicate with non-PSTN networks such as networks 110*a*, 110*c* and 110*d*.

Any of networks 110*a*, 110*c* and/or 110*d* may be coupled to other IP networks including, but not limited to, the Internet. Because IP networks share a common method of transmitting data, signals may be transmitted between devices located on different, but interconnected, IP networks. In addition to being coupled to other IP networks, any of networks 110*a*, 110*c* and/or 110*d* may also be coupled to non-IP networks through the use of interfaces or components such as gateways.

Networks 110 may be connected to each other and with other networks via a plurality of wired links 160, wireless connections 150, and nodes 170. Not only do the wired links 160, wireless connections 150, and nodes 170 connect various networks but they also interconnect endpoints 140 with one another and with any other components coupled to or a part of any of networks 110. The interconnection of networks 110*a*-110*d* may enable endpoints 140 to communicate data and control signaling between each other as well as allowing any intermediary components or devices to communicate data and control signals. Accordingly, users of endpoints 140, may be able to send and receive data and control signals between and among each network component coupled to one or more of networks 110*a*-110*d*.

Wireless connections 150 may represent a wireless connection between two components using, for example, WiMAX. The extended range of a WiMAX base station and/or relay station may allow network 110*a* to cover the larger geographic area associated with a MAN while using a relatively small number of wired links. More specifically, by properly arranging base station 120 and multiple relay stations 130 around a metropolitan area, the multiple relay stations 130 may use wireless connections 150 to communicate with base station 120 and wireless endpoints 140 throughout the metropolitan area. Then base station 120 may, through wired connection 160*a*, communicate with other base stations, network components not capable of establishing a wireless connection, and/or other networks outside of the MAN, such as network 110*d* or the Internet.

Nodes 170 may include any combination of network components, session border controllers, gatekeepers, base stations, conference bridges, routers, hubs, switches, gateways, endpoints, or any other hardware, software, or embedded logic implementing any number of communication protocols that allow for the exchange of packets in communication system 100. For example, node 170*a* may comprise another base station that is wired to base station 120 via link 160*j* and to network 110*d* via link 160*a*. As a base station, node 170*a* may be able to establish several wireless connections with various other base stations, relay stations, and/or endpoints. As another example, node 170*e* may comprise a gateway. This may allow network 110*b*, a PSTN network, to be able to transmit and receive communications from other non-PSTN networks, such as network 110*d*, an IP network. Node 170*e*, as a gateway, works to translate communications between the various protocols used by different networks.

Endpoints 140 and/or nodes 170 may comprise any combination of hardware, software, and/or encoded logic that provides data or network services to a user. For example, endpoints 140*a*-140*d* may include an IP telephone, a computer, a video monitor, a camera, a personal data assistant, a cell phone or any other hardware, software and/or encoded logic that supports the communication of packets (or frames) using networks 110. Endpoints 140 may also include unattended or automated systems, gateways, other intermediate components or other devices that can send or receive data and/or signals. Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
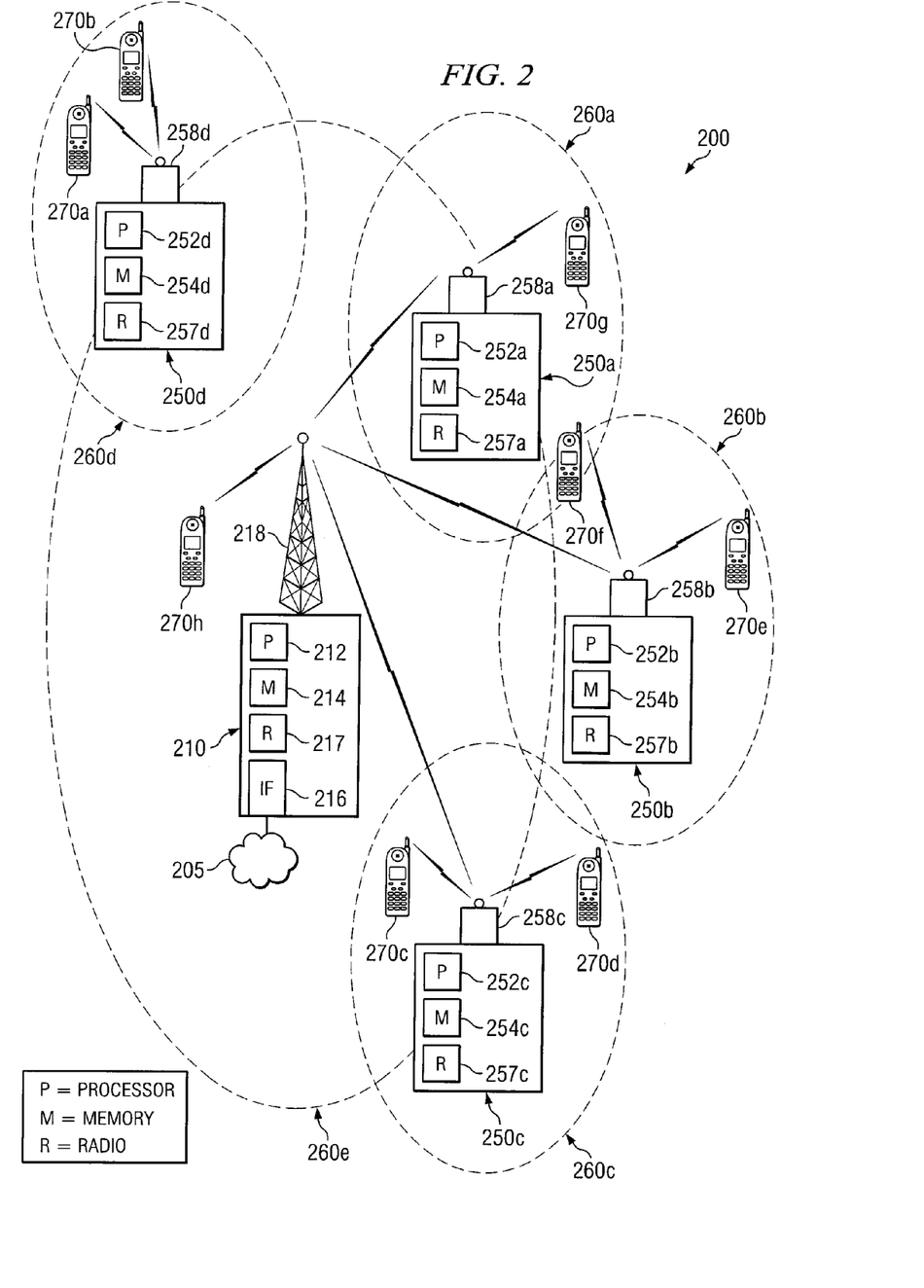
FIG. 2 illustrates a wireless network comprising a more detailed view of a base station and several relay stations, in accordance with a particular embodiment.

FIG. 2 illustrates a wireless network 200 comprising a more detailed view of base station 210 and relay stations 250, in accordance with a particular embodiment. In different embodiments network 200 may comprise any number of wired or wireless networks, base stations, endpoints, relay stations, and/or any other components that may facilitate or participate in the communication of data and/or signals whether via wired or wireless connections. For simplicity, network 200 comprises network 205, base station 210, endpoints 270 and relay stations 250. Base station 210 comprises processor 212, memory 214, interface 216, radio 217 and antenna 218. Similarly, relay stations 250 comprise processors 252, memory modules 254, radios 257 and antennas 258. These components may work together in order to provide base station and/or relay station functionality, such as providing wireless connections in a wireless network (e.g., a WiMAX wireless network). Network 205 may comprise one or more of the networks described above with respect to FIG. 1. For example, network 205 may comprise the Internet, a LAN, WAN, MAN, PSTN or some combination of the above.

Processor 212 may be a microprocessor, controller, or any other suitable computing device, resource, or combination of hardware, software and/or encoded logic operable to provide, either alone or in conjunction with other base station 210 components, such as memory 214, base station 210 functionality. Such functionality may include providing various wireless features discussed herein to an endpoint or relay station, such as endpoint 270*h* or relay station 250*a*. Processor 212 may be used in creating and/or populating an interference matrix representing which pairs of relay stations may interact and/or be subject to interference from one another. Processor 212 may use the interference matrix in assigning wireless resources to relay stations 250. More specifically, in particular embodiments, processor 212 may use the interference matrix to determine the parameters (e.g., bandwidth, frequency, time slot, subchannel) of a primary wireless resource and possibly a secondary wireless resource to assign to each relay station.

Memory 214 may be any form of volatile or non-volatile memory including, without limitation, magnetic media, optical media, random access memory (RAM), read-only memory (ROM), removable media, or any other suitable local or remote memory component. Memory 214 may store any suitable data or information, including software and encoded logic, utilized by base station 210. In some embodiments memory 214 may store information used by processor 212 in creating the interference matrix, as well as the interference matrix itself. Memory 214 may also store information regarding the amount of data communicated over wireless connections 260a-260d. The information may include average data rates based on individual endpoints, average data rates based on the type of service being used, or any other type of data rates that may be desired. Memory 214 may also maintain a list, database, or other organization of data useful for determining how to route data to the proper endpoints and/or relay stations. For example, in some embodiments a tree structure (as opposed to a mesh structure) may be used in routing data from an endpoint to a base station. More specifically, there may be a known path from base station 210 to endpoint 270b. This path, or a portion thereof, may be stored in memory 214.

Base station 210 also comprises interface 216 which may be used in the wired communication of signaling and/or data between base station 210 and network 205. For example, interface 216 may perform any formatting or translating that may be needed to allow base station 210 to send and receive data from network 205 over a wired connection.

Radio 217 may be coupled to or a part of antenna 218. Radio 217 may receive digital data that is to be sent out to other base stations, relay stations and/or endpoints via a wireless connection. Radio 217 may convert the digital data into a radio signal having the appropriate center frequency and bandwidth parameters. These parameters may have been determined ahead of time by some combination of processor 212 and memory 214. The radio signal may then be transmitted via antenna 218 to the appropriate recipient (e.g., relay station 250d). Similarly, radio 217 may convert radio signals received from antenna 218 into digital data to be processed by processor 212.

Antenna 218 may be any type of antenna capable of transmitting and receiving data and/or signals wirelessly. In some embodiments, antenna 218 may comprise one or more omnidirectional, sector or panel antennas operable to transmit/receive radio signals between 2 GHz and 66 GHz. An omnidirectional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

Relay stations 250 comprise components similar to those of base station 210. One exception may be that relay stations 250 may not include an interface for a wired connection. This may be because relay stations 250 may only use wireless connections, and thus may not need a wired connection. By allowing relay stations 250 to be deployed without a wired connection, the initial deployment cost may be lower because network wires do not have to be run out to each relay station 250. Relay stations 250a, 250b, 250c, and 250d may comprise similar components and may provide similar functionality, therefore, for simplicity, the following discussion of the relay station components depicted in FIG. 2 may refer to the component in general and may be applied to each relay station.

Like base station 210, relay station 250 comprises a processor. Processor 252 may be a microprocessor, controller, or any other suitable computing device, resource, or combination of hardware, software and/or encoded logic operable to provide, either alone or in combination with other relay station 250 components, such as memory module 254, relay station 250 functionality. Such functionality may include providing various wireless features discussed herein to an endpoint or base station, such as endpoints 270a-270b or base station 210. In instances in which relay station 250 has been allocated a primary wireless resource and a secondary wireless resource, processor 252 may be used in determining when to transition from the secondary wireless resource to the primary wireless resource.

Like memory 214, memory module 254 may be any form of volatile or non-volatile memory including, without limitation, magnetic media, optical media, random access memory (RAM), read-only memory (ROM), removable media, or any other suitable local or remote memory component. Memory module 254 may store any suitable data or information, including software and encoded logic, utilized by relay station 250d. In some embodiments memory module 254 may store information such as the various parameters of both the primary and secondary wireless resource that has been assigned to relay station 250. Memory module 254 may also maintain a list, database, or other organization of data useful for determining how to route data to the proper endpoints, base stations and/or relay stations.

Radio 257 may be coupled to or a part of antenna 258. Radio 257 may receive digital data from, for example, processor 252 that is to be sent out to other base stations, relay stations and/or endpoints via a wireless connection. The wireless connection may use either the primary or secondary wireless resource assigned to relay station 250. The characteristics of the wireless connection (e.g., the center frequency, bandwidth, time slot, and/or subchannel) may depend on whether the wireless connection is using the primary or secondary wireless resource assigned to relay station 250. Radio 257 may convert the digital data into a radio signal having the appropriate center frequency and bandwidth parameters. These parameters may have been determined ahead of time by base station 210 or processor 252. The radio signal from radio 257 may then be transmitted via antenna 258 to the appropriate recipient (e.g., base station 210). Radio 257 may also convert radio signals received by antenna 258 into digital data to be processed by processor 252.

Antenna 258 may be any type of antenna capable of transmitting and receiving data and/or signals wirelessly. In some embodiments, antenna 258 may comprise one or more omnidirectional, sector or panel antennas operable to transmit/receive radio signals between 2 GHz and 66 GHz.

Endpoints 270 may be any type of wireless endpoints able to send and receive data and/or signals to and from base station 210 or relay stations 250. Some possible types of endpoints 270 may include desktop computers, PDAs, cell phones, laptops, and/or VoIP phones.

To better understand how the various components of base station 210 and relay stations 250 work to provide the functionality of particular embodiments, the components of the illustrated embodiment will be discussed in the context of an example. For purposes of this example it will be assumed that the communication range of base station 210 and relay stations 250 is known. Communication cells 260 represent the communication range of their respective base station or relay station (e.g., communication cell 260e represents the communication range of base station 210, and communication cell 260b represents the communication range of relay station 250b). Communication cells 260 may be used in placing relay stations 250 around base station 210. For example, relay station 250a may be placed close enough to base station 210 to be within communication cell 260e, but far enough away from relay station 250b so that their respective communication cells overlap over a relatively small area. The overlap between relay station 250a and 250b may reduce the chance of a user experiencing loss of service as they move between different communication cells. However, were relay station 250*a* and 250*b* to use the same wireless resource, endpoint 270*f* may experience interference from relay station 250*b* if he is connected to relay station 250*a*. Thus, it may be desirable in some embodiments for relay stations 250*a* and 250*b* to use different wireless resources. However, it may not be necessary for relay stations 250*a*, 250*b*, 250*c*, and 250*d* to all use different wireless resources. For example, while an endpoint such as endpoint 270*f* may be within communication cells 260*a* and 260*b*, it is not within communication cells 260*c* or 260*d*. Therefore, the wireless resource used by relay station 250*d* may be reused, in whole or in part, by relay stations 250*a*, 250*b* or 250*c* because its geographic location is such that an endpoint within communication cell 260*d* could not be within any of communication cells 260*a*, 260*b* or 260*c*, and thus would not be subject to interference from relay stations 250*a*-250*c*.

Processor 212 of base station 210 may take advantage of this buy allocating wireless resources among relay stations 250 such that some of the wireless resources are reused. One way in which processor 212 may determine which relay stations may use the same wireless resources is with an interference matrix. Each relay station may be represented in a row and a column of the interference matrix. Then each entry in the interference matrix would represent whether or not the two respective relay stations may experience interference between each other. For example, because relay stations 250*b* and 250*c* are proximate to one another and communication cell 260*b* overlaps communication cell 260*c*, the interference matrix entry representing the interference of relay station 250*b* on relay station 250*c* and the interference matrix entry representing the interference of relay station 250*c* on relay station 250*b* may be a 1. On the other hand, because relay stations 250*c* and 250*d* are on opposite sides of communication cell 260*e* the interference matrix entry representing the interference of relay station 250*c* on relay station 250*d* and the interference matrix entry representing the interference of relay station 250*d* on relay station 250*c* may be 0. The complete interference matrix may be stored in memory 214 and, in particular embodiments, may look like the following:

|  | Relay station 250a | Relay station 250b | Relay station 250c | Relay station 250d |
| --- | --- | --- | --- | --- |
| Relay station 250a | — | 1 | 0 | 0 |
| Relay station 250b | 1 | — | 1 | 0 |
| Relay station 250c | 0 | 1 | — | 0 |
| Relay station 250d | 0 | 0 | 0 | — |

The interference matrix may be populated in a variety of methods. For example, in some embodiments, once base station 210 and relay stations 250 have been deployed, base station 210 may assign an exclusive transmission window to each relay station 270. Then, while each relay station is transmitting during its exclusive transmission window, the remaining relay stations may measure the receiver signal strength indication (RSSI) or carrier interference and noise ratio (CINR). More specifically, in some embodiments base station 210 may send a report request (REP-REQ) message to relay stations 250 using for example a CID of ALL_RS_CID. The REP-REQ message may indicate that a type length value (TLV) of a Channel Type Request field may be set for RS Sounding. The number of relay stations 250, each relay station 250's CIDs, and a reporting period may also be included in the REP-REQ. When relay station 250*d*, for example, receives the REP-REQ, it expects to hear a Sounding zone allocation IE message in the subsequent frames until the reporting time indicated in the REP-REQ message. Then, base station 210 may allocate a Sounding zone allocation IE (an exclusive transmission period) for relay station 250*d*. In particular, the last bit in the Sounding zone allocation IE is enabled to indicate the burst is for relay station 250*d* to transmit a sounding signal. This bit also informs all the remaining relay stations of measuring the sounding signal from relay station 250*d*. The scheduling of all Sounding zone allocation IEs by base station 210 may be implementation specific.

The measurements made by relay stations 250 may be stored in memory 254, along with information that may be used to identify which relay station is associated with the measurement. Once each relay station has transmitted at least once, processor 252 may load each measurement from memory 254 to create a vector of the measurement reports to be sent to base station 210. In some embodiments processor 252 may load each measurement after the number of frames whose value was indicated in the report period in the REP-REQ message has been passed.

Upon receiving vectors from each relay station 250, processor 212 of base station 210 may use the vectors to populate the interference matrix. For example, memory 214 may contain a predetermined threshold, and processor 212 may look at each measurement to determine if the measurement value is above or below the threshold and based on the determination it may enter a 1 or a 0 in the corresponding entry in the interference matrix. In some embodiments it may be desirable to estimate the interference by measuring the pilot sub-carrier (along the time dimension) or the preamble (along the frequency dimension).

Another way in which the interference matrix may be populated is through pre-deployment planning. Using this technique a network designer may determine the communication range and maximum interference ranges by taking into account the possible locations of endpoint 270. If the maximum interference range of two relay stations overlaps then the corresponding entries would be populated with a 1, and if the interference ranges of two relay stations do not overlap then the corresponding entries would be populated with a 0. For example, the matrix entries corresponding to where relay station 250*c* intersects relay station 250*b*, and vice-versa, may contain a 1 because communication cell 260*c* overlaps communication cell 260*b*. As another example, the matrix entries corresponding to where relay stations 250*d* and 250*a* intersect may contain a 0 because communication cell 260*d* and 260*a* do not overlap.

Both of these techniques are means of estimating the interference, actual interference may vary depending on such factors as weather, endpoint position, relay station position and interference range.

Upon determining the wireless resource allocation, processor 212 may prepare the allocation information to be sent to relay stations 250. For example, in particular embodiments, processor 212 may prepare the allocation information to be included with the next preamble and downlink and uplink map that is broadcast by base station 210 to all relay stations (e.g., relay stations 250) and endpoints (e.g., 270*h*) connected thereto. In some embodiments, processor 212 may prepare the allocation information to be part of a series of allocation messages, each allocation message sent to a particular relay station detailing the wireless resource allocation for that particular relay station (e.g., an allocation message sent to relay station 250c may contain resource allocation information for relay station 250c).

Regardless of how the information is sent to the various relay stations, once a relay station receives information indicating which wireless resource the relay station is to use, the relay station may configure itself to communicate with its respective endpoints using the allocated wireless resource. For example, relay station 250a, may receive the allocation information from base station 210 via antenna 258a. The radio signal containing the allocation information may be converted to digital data by radio 257a to be processed by processor 252a. Processor 252a may determine that a secondary resource has been allocated to relay station 250a, processor 252a may initially configure radio 257a to use the secondary wireless resource. Relay stations 250b, 250c and 250d may also configure themselves in a similar manner; initially using any secondary wireless resource that may have been assigned to them.

Because relay stations 250a, 250b and 250c are geographically positioned such that they are proximate to, and may experience interference from, one another, the initial configuration of radios 252a and 252b may change. Because relay station 250c may be assigned a first wireless resource as a primary resource while relay stations 250a and 250b are assigned the first wireless resource as a secondary resource, any interference between relay station 250c and relay stations 250a or 250b may cause relay station 250a or 250b to reconfigure itself so as to use their respective primary resource. For example, should there be interference within the first wireless resource between relay station 250b and relay station 250c, relay station 250b may change to a second wireless resource designated as its primary resource. It should be noted that when relay station 250b changes to the second wireless resource it may be for a wireless connection or connections with one, some, or all of the endpoints connected to relay station 250b.

Relay stations 250 may detect interference through several different methods. For example, relay station 250b may identify the possibility of interference upon receiving, via antenna 258b and radio 257b, several automatic retransmission requests from endpoint 270f within a relatively short amount of time. Based on this, processor 252b may infer from the repeated retransmission requests that endpoint 270f is experiencing interference using the secondary channel and that relay station 250b should switch to the primary channel. Another example may be to use explicit measures. Processor 252a may periodically, or upon the occurrence of some particular event (e.g., when relay station 252a detects the probability of successful transmission to endpoint 270f is below a predetermined threshold) generate a report request (REP-REQ) requesting one or more endpoints 270 to send a report response (REP-RSP) reporting their signal quality using, for example, RSSI or CINR.

In some embodiments, upon detecting interference with respect to a particular endpoint, the relay station may stop using the secondary resource and begin using the primary resource to communicate with the particular endpoint, while the remaining endpoints (that are not experiencing any interference) may continue to use the secondary resource. In particular embodiments, different policies may be used. For example, a simple approach may be to move the endpoint/endpoints that are using the largest amount of wireless resources to the primary resource and then reallocate the remaining endpoints among the secondary resource. This may take advantage of the rational that an endpoint that is using less of the wireless resource has less of a chance of overlapping (partially or completely) with another endpoint using the same resource.

Not only may relay stations 250 shift endpoints from the secondary resource to the primary resource based on detecting interference, but it may also shift endpoints between the primary and secondary wireless resource based on adjustments to the wireless resource allocation made by base station 210. More specifically, base station 210 may adjust how the primary and secondary resources are allocated among the various relay stations in response to changes in the traffic demand among the various relay stations 250. For example, base station 210 may increase the size of the primary and secondary wireless resource assigned to base station 250c and decrease the size of the primary and secondary wireless resource assigned to relay station 250b if base station 210 identifies an increase in traffic demand from relay station 250c, and a decrease in traffic demand from relay station 250b. As another example, base station 210 may reallocate wireless resources if the primary resource of relay station 250a is insufficient to support interference-free communication for the endpoints connected thereto. Yet another example in which base station 210 may reallocate wireless resources may arise where endpoint 270f, using the secondary resource of relay station 250b may not itself experience interference but may cause interference within with the primary resource used by relay station 250a. Because relay station 250a is already using its primary resource and relay station 250b is unaware of the interference, base station 210 may adjust the resources so that the resource is not being shared by relay stations 250a and 250b.

Thus far several different embodiments and features have been presented. Particular embodiments may combine one or more of these features depending on operational needs and/or component limitations. This may allow for great adaptability of network 200 to the needs of various organizations and users. For example, a particular embodiment may use several base stations to provide wireless access for a metropolitan area, or a single base station may be used with several relay stations providing the necessary coverage. Furthermore, in some embodiments, relay stations 250 may have more or less radios.

FIG. 3 illustrates a graphical representation of an allocation of wireless resources, in accordance with a particular embodiment. For simplicity, wireless resources 310 are time slots that are assumed to cover the same set of sub-carriers so the frequency dimension is not depicted. Each relay station (RSa-RSd) is assigned one or more wireless resources 310 as either a primary or secondary wireless resource.

Resource allocation 300 may be how base station 210 allocates wireless resources in wireless network 200 of FIG. 2. Base station 210 may have used, for example, the interference matrix above in allocating the wireless resources. More specifically, wireless resources 310b and 310c are allocated to relay station RSa as secondary wireless resource 315b and primary wireless resource 315a, respectively, wireless resources 310a and 310b are allocated to relay station RSb as primary wireless resource 316a and secondary wireless resource 316b, respectively, wireless resource 310b is allocated to relay station RSc as primary wireless resource 317a, and wireless resources 310a-310c are allocated to relay station RSd as primary wireless resource 318a. Under this allocation scheme all three wireless resources 310 have been allocated to multiple relay stations RS, allowing for each wireless resource 310 to be reused. More specifically, wireless resource 310a has been assigned to relay stations RSb and RSd, wireless resource 310b has been assigned to relay stations RSa-RSd, and wireless resource 310c has been assigned to relay stations RSa and RSd.

Using wireless resource allocation 300 relay stations RSa-RSc may initially be configured to use wireless resource 310b while relay station RSd may initially be configured to use all three wireless resources 310. As can be seen, this allows for all four relay stations to use, at least initially, the same wireless resource. Furthermore, as can be seen, the three proximate relay stations RSa-RSc which may experience interference from one another all have a primary wireless resource that is not being shared with any of relay stations RSa-RSc. Were relay station RSa, for example, to detect interference with an endpoint connected thereto, it may simply move that endpoint from secondary wireless resource 315b to primary wireless resource 315a. The three primary wireless resources used by relay stations RSa-RSc may be shared with RSd without fear of interference because RSd may be geographically positioned such that it may not be possible for there to be interference.

Figure 4A:
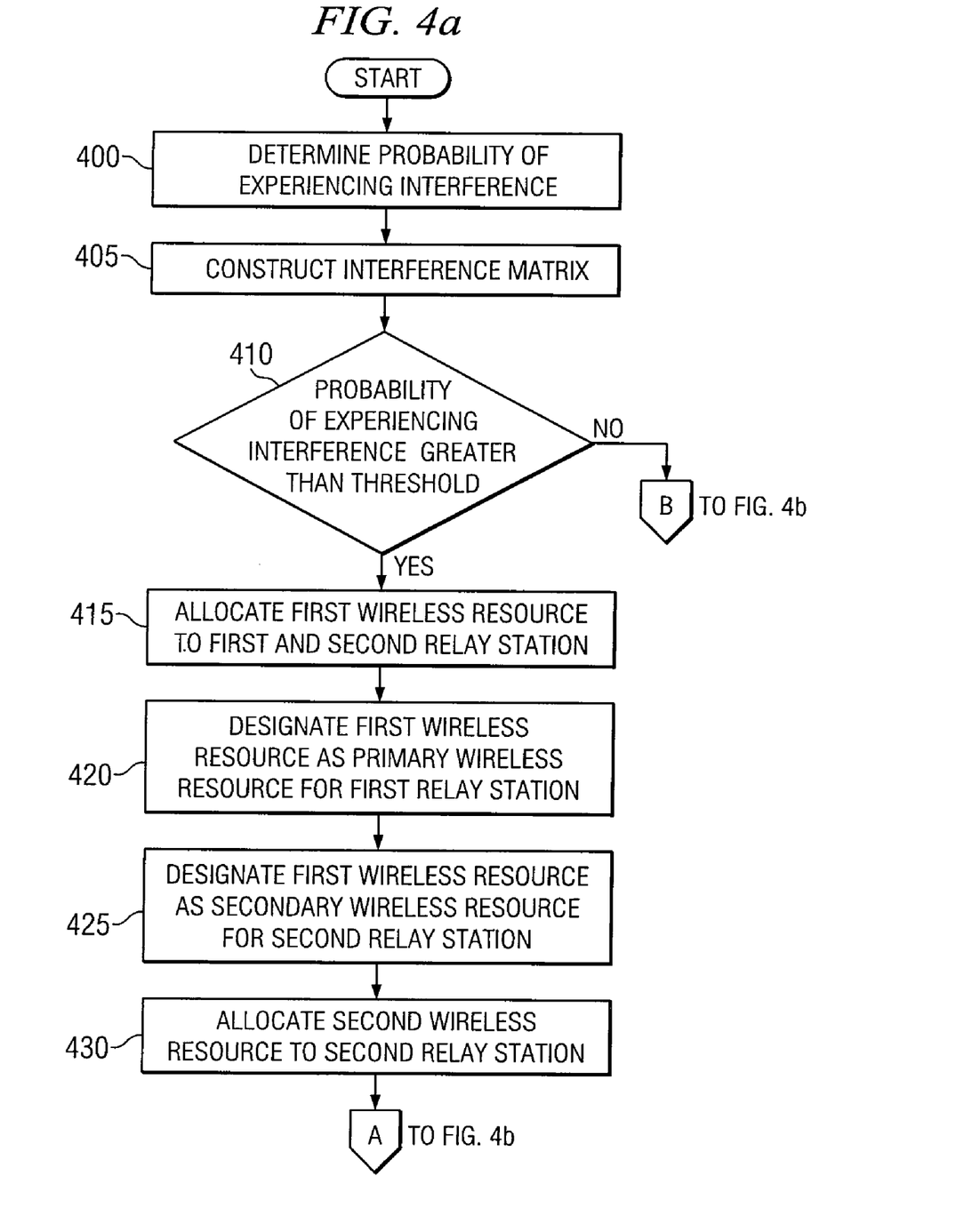
FIG. 4 illustrates a method for reusing wireless resources in a wireless network, in accordance with a particular embodiment.
Figure 4B:
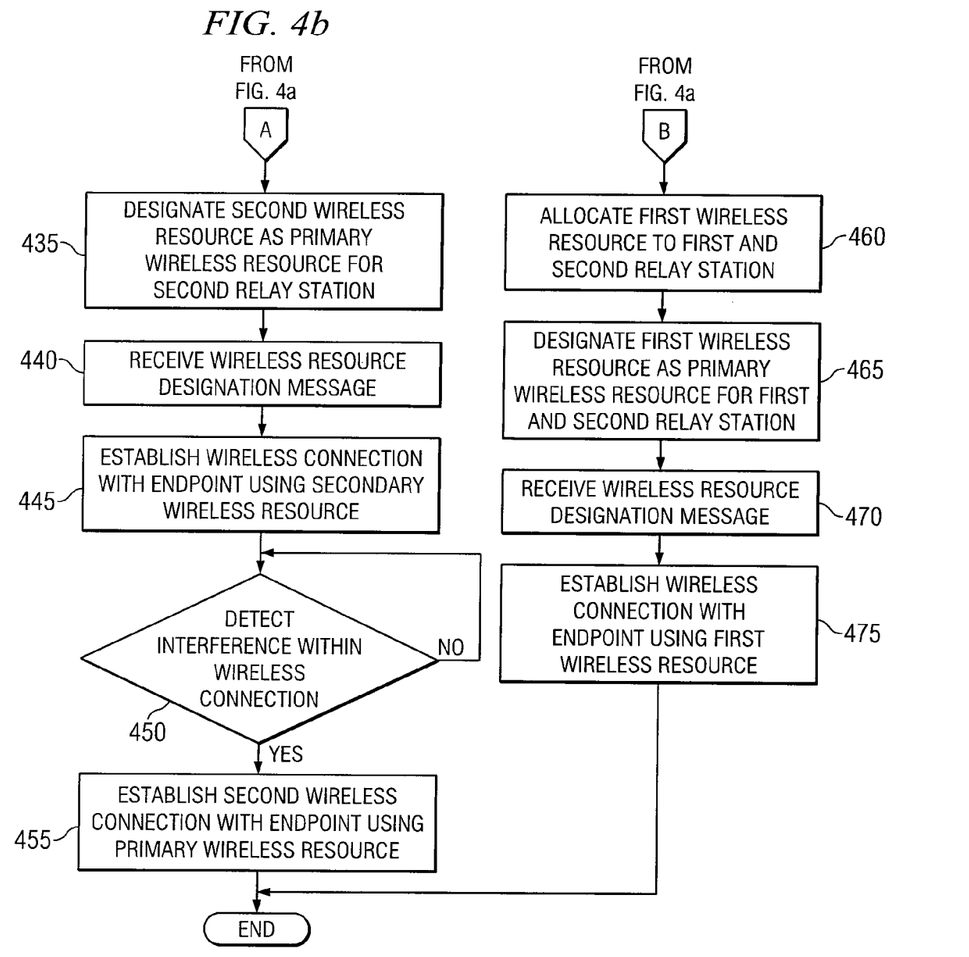

FIG. 4 illustrates a method for reusing wireless resources in a wireless network, in accordance with a particular embodiment. The illustrated method allows, among other things, for a base station to assign the same wireless resource to multiple relay stations, while at the same time providing the relay stations with the ability to switch to a primary wireless resource in which they are assured interference free communication if they experience interference using the secondary wireless resource.

The method begins at step 400 where the probability of two relay stations experiencing interference is determined. As discussed above, in some embodiments, this may be done before the wireless network comprising the base station and relay stations is setup and in particular embodiments it may be done through a series of communications between relay stations and the base station.

Then, at step 405, an interference matrix is constructed. In particular embodiments an entry in the interference matrix may contain a 1 if the probability of the two respective relay stations experiencing interference is above an interference threshold value, or it may contain a 0 if the probability is below the interference threshold value.

Depending on whether or not the probability of two relay stations experiencing interference is greater than the interference threshold value (e.g., whether a particular matrix entry contains a 1 or a 0) the base station may assign more than one wireless resource and/or it may designate a secondary wireless resource. Depending on the embodiment and the operational requirements of the network, different threshold values may be used. For example, the threshold value may be set relatively high (e.g., the probability of two relay stations experiencing interference is close to 1) indicating that the two relevant relay stations may not reuse the wireless resource. Another example may involve a relatively low interference threshold value in which case one relay station may be assigned a primary resource that is reused as a secondary wireless resource for the other relay station.

If the probability of experiencing interference is greater than the interference threshold value, then at step 415 the relay station will allocate a first wireless resource to both a first and second relay station. Then at steps 420 and 425, the first wireless resource is designated as a primary wireless resource for the first relay station and as a secondary wireless resource for the second relay station. Because the first wireless resource was designated as the primary wireless resource for the first relay station, the first relay station is the primary user of the first wireless resource. Thus, should there be any interference within the first wireless resource, the second relay station may have to give way to the first relay station. In order for the second relay station to be able to give way to the first relay station on the first wireless resource the second relay station may need to have its own primary wireless resource. Accordingly, at steps 430 and 435 the base station allocates a second wireless resource to the second relay station and designates the second wireless resource as the primary wireless resource for the second relay station.

After the base station has determined how the wireless resources are to be allocated it may notify the relay stations via a wireless resource designation message. The designation message is received at step 440 by, for example, the second relay station. Using the information within the designation message the second relay station uses its secondary wireless resource (the first wireless resource) to establish a wireless connection with an endpoint at step 445. If, at step 450, interference is detected in the wireless connection with the endpoint, then at step 455 the relay station may stop using its secondary wireless resource and instead establish a second wireless connection with the endpoint using its primary wireless resource (the second wireless resource). As discussed above the interference may be detected by the second relay station receiving several retransmission requests within a relatively short amount of time, or by requesting the endpoint report its signal quality.

Now, returning to step 410, if the probability of experiencing interference is not greater than the interference threshold value, then the base station does not need to assign a secondary wireless resource to the two relay stations. More specifically, if there is no chance of interference then there may not arise a need for one of the relay stations to move an endpoint to a different wireless resource. Accordingly, at steps 460 and 465 the base station allocates a first wireless resource to both the first and second relay stations and designates the first wireless resource as the primary wireless resource for the first and second relay stations. This information is communicated to the relay stations via a wireless resource designation message which is received at step 470 by, for example, the first relay station. Then at step 475 the first relay station establishes a wireless connection with the endpoint using its primary wireless resource.

Some of the steps illustrated in FIG. 4 may be combined, modified or deleted where appropriate, and additional steps may also be added to the flowchart. Additionally, steps may be performed in any suitable order without departing from the scope of the invention.

While various implementations and features are discussed with respect to multiple embodiments, it should be understood that such implementations and features may be combined in various embodiments. For example, features and functionality discussed with respect to a particular figure, such as FIG. 2, may be used in connection with features and functionality discussed with respect to another such figure, such as FIG. 1, according to operational needs or desires.

Although particular embodiments have been described in detail, it should be understood that various other changes, substitutions, and alterations may be made hereto without departing from the spirit and scope of the present invention. For example, although an embodiment has been described with reference to a number of elements included within communication system 100 such as endpoints, base stations and relay stations, these elements may be combined, rearranged or positioned in order to accommodate particular routing architectures or needs. In addition, any of these elements may be provided as separate external components to communication system 100 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for reusing wireless resources in a wireless network, comprising:
   determining the probability of a first communication with a first relay station experiencing interference from a second relay station;
   upon determining that the probability of experiencing interference from the second relay station is greater than an interference threshold:
      allocating a first wireless resource to the first relay station and the second relay station;
      designating the first wireless resource as a primary wireless resource for the first relay station;
      designating the first wireless resource as a secondary wireless resource for the second relay station for use by the second relay station until the first relay station experiences interference from the second relay station;
      allocating a second wireless resource to the second relay station; and
      designating the second wireless resource as a primary wireless resource for the second relay station.

2. The method of claim 1, further comprising, upon determining that the probability of experiencing interference from the second relay station is less than an interference threshold:
   allocating the first wireless resource to the first relay station and the second relay station; and
   designating the first wireless resource as a primary wireless resource for the first relay station and the second relay station.

3. The method of claim 1, wherein the first wireless resource and the second wireless resource comprise different bandwidths.

4. The method of claim 1, wherein the first wireless resource and the second wireless resource comprise different frequencies.

5. The method of claim 1, wherein the first wireless resource and the second wireless resource comprise different time slots.

6. The method of claim 1, wherein the first wireless resource and the second wireless resource comprise different subchannels.

7. The method of claim 1, wherein determining the probability of the first communication with the first relay station experiencing interference from the second relay station comprises constructing an interference matrix wherein a matrix entry corresponding to the probability of the first communication with the first relay station experiencing interference from a second relay station comprises a 1 if the probability of experiencing interference from the second relay station is greater than an interference threshold and a 0 if the probability of experiencing interference from the second relay station is less than an interference threshold.

8. The method of claim 1, wherein determining the probability of the first communication with the first relay station experiencing interference from the second relay station comprises determining the probability of the first communication with the first relay station experiencing interference from the second relay station prior to deploying the plurality of the wireless components.

9. The method of claim 1, wherein determining the probability of the first communication with the first relay station experiencing interference from the second relay station comprises receiving an interference vector report from each relay station, the interference vector report for the first relay station comprising a measure of a level of a signal transmitted by the second relay station.

10. The method of claim 1:
    further comprising receiving traffic demand data from the first relay station and the second relay station; and
    wherein the steps of allocating a first wireless resource to the first relay station and the second relay station, designating the first wireless resource as a primary wireless resource for the first relay station, designating the first wireless resource as a secondary wireless resource for the second relay station, allocating a second wireless resource to the second relay station, and designating the second wireless resource as a primary wireless resource for the second relay station are based on the traffic demand data from the first relay station and the second relay station.

11. The method of claim 1, wherein, upon determining that the probability of experiencing interference from the second relay station is greater than an interference threshold:
    the first wireless resource designated as a primary wireless resource for the first relay station is not designated as a primary wireless resource for any other relay station for which it is determined that the probability of the first relay station experiencing interference is greater than the interference threshold;
    the first wireless resource may be designated as a secondary wireless resource for a plurality of relay stations; and
    the second wireless resource designated as a primary wireless resource for the second relay station is not designated as a primary wireless resource for any other relay station for which it is determined that the probability of the second relay station experiencing interference is greater than the interference threshold.

12. A method for reusing resources in a wireless network, comprising:
    receiving at a relay station a wireless resource designation message from a base station, the wireless resource designation message designating:
       a first wireless resource to be used as a primary wireless resource; and
       a second wireless resource to be used as a secondary wireless resource by the relay station until another relay station using the second wireless resource experiences interference from the relay station, the second wireless resource also being used by a proximate relay station;
    establishing a first wireless connection with an endpoint using the second wireless resource; and
    upon detecting interference from the proximate relay station using the second wireless resource with the first wireless connection with the endpoint using the second wireless resource, establishing a second wireless connection with the endpoint using the primary wireless resource while the proximate relay station continues to use the second wireless resource.

13. The method of claim 12, wherein detecting interference from the proximate relay station with the first wireless connection with the endpoint using the second wireless resource comprises receiving from the endpoint a first number of requests for retransmission within a first amount of time.

14. The method of claim 12, wherein detecting interference from the proximate relay station with the first wireless connection with the endpoint using the second wireless resource comprises:
   sending the endpoint a request for a signal quality report; and
   receiving from the endpoint the signal quality report.

15. The method of claim 12, wherein the first wireless resource and the second wireless resource comprise different bandwidths.

16. The method of claim 12, wherein the first wireless resource and the second wireless resource comprise different frequencies.

17. The method of claim 12, wherein the first wireless resource and the second wireless resource comprise different time slots.

18. The method of claim 12, wherein the first wireless resource and the second wireless resource comprise different subchannels.

19. The method of claim 12, wherein:
   the first wireless resource is not used as a primary wireless resource for any other relay station from which it is determined that the probability of experiencing interference at the relay station is greater than an interference threshold; and
   the first wireless resource is configured to be designated as a secondary wireless resource for a plurality of relay stations.

20. A system for reusing wireless resources in a wireless network, comprising a processor operable to:
   determine the probability of a first communication with a first relay station experiencing interference from a second relay station;
   upon determining that the probability of experiencing interference from the second relay station is greater than an interference threshold:
      allocate a first wireless resource to the first relay station and the second relay station;
      designate the first wireless resource as a primary wireless resource for the first relay station;
      designate the first wireless resource as a secondary wireless resource for the second relay station wherein the secondary wireless resource is configured to be used by the second relay station until the first relay station experiences interference from the second relay station;
      allocate a second wireless resource to the second relay station; and
      designate the second wireless resource as a primary wireless resource for the second relay station.

21. The system of claim 20, wherein the processor is further operable to, upon determining that the probability of experiencing interference from the second relay station is less than an interference threshold:
   allocate the first wireless resource to the first relay station and the second relay station; and
   designate the first wireless resource as a primary wireless resource for the first relay station and the second relay station.

22. The system of claim 20, wherein the processor operable to determine the probability of the first communication with the first relay station experiencing interference from the second relay station is further operable to construct an interference matrix wherein a matrix entry corresponding to the probability of the first communication with the first relay station experiencing interference from a second relay station comprises a 1 if the probability of experiencing interference from the second relay station is greater than an interference threshold and a 0 if the probability of experiencing interference from the second relay station is less than an interference threshold.

23. The system of claim 20:
   further comprising an interface coupled to the processor and operable to receive traffic demand data from the first relay station and the second relay station; and
   wherein the processor operable to allocate a first wireless resource to the first relay station and the second relay station is further operable to allocate a first wireless resource to the first relay station and the second relay station based on the traffic demand data from the first relay station and the second relay station;
      wherein the processor operable to designate the first wireless resource as a primary wireless resource for the first relay station is further operable to designate the first wireless resource as a primary wireless resource for the first relay station based on the traffic demand data from the first relay station and the second relay station;
      wherein the processor operable to designate the first wireless resource as a secondary wireless resource for the second relay station is further operable to designate the first wireless resource as a secondary wireless resource for the second relay station based on the traffic demand data from the first relay station and the second relay station;
      wherein the processor operable to allocate a second wireless resource to the second relay station is further operable to allocate a second wireless resource to the second relay station based on the traffic demand data from the first relay station and the second relay station; and
      wherein the processor operable to designate the second wireless resource as a primary wireless resource for the second relay station is further operable to designate the second wireless resource as a primary wireless resource for the second relay station based on the traffic demand data from the first relay station and the second relay station.

24. A system for reusing resources in a wireless network, comprising:
   an interface at a relay station operable to receive a wireless resource designation message from a base station, the wireless resource designation message designating a first wireless resource to be used as a primary wireless resource and a second wireless resource to be used as a secondary wireless resource, wherein the secondary wireless resource is configured to be used by the relay station until another relay station using the second wireless resource experiences interference from the relay station, the second wireless resource also being used by a proximate relay station; and
   a processor coupled to the interface and operable to:
      establish a first wireless connection with an endpoint using the second wireless resource; and
      upon detecting interference from the proximate relay station using the second wireless resource with the first wireless connection with the endpoint using the second wireless resource, establish a second wireless connection with the endpoint using the primary wireless resource while the proximate relay station continues to use the second wireless resource.

25. The system of claim 24, wherein detecting interference from the proximate relay station with the first wireless connection with the endpoint using the second wireless resource comprises the interface being further operable to receive from the endpoint a first number of requests for retransmission within a first amount of time.

26. The system of claim 24, wherein detecting interference from the proximate relay station with the first wireless connection with the endpoint using the second wireless resource comprises the interface being further operable to:
send the endpoint a request for a signal quality report; and
receive from the endpoint the signal quality report.

27. Logic encoded in a non-transitory computer readable medium that when executed is operable to:
determine the probability of a first communication with a first relay station experiencing interference from a second relay station;
upon determining that the probability of experiencing interference from the second relay station is greater than an interference threshold:
allocate a first wireless resource to the first relay station and the second relay station;
designate the first wireless resource as a primary wireless resource for the first relay station;
designate the first wireless resource as a secondary wireless resource for the second relay station wherein the secondary wireless resource is configured to be used by the second relay station until the first relay station experiences interference from the second relay station;
allocate a second wireless resource to the second relay station; and
designate the second wireless resource as a primary wireless resource for the second relay station.

28. The logic encoded in the non-transitory computer readable medium of claim 27, wherein the logic, when executed, is further operable to, upon determining that the probability of experiencing interference from the second relay station is less than an interference threshold:
allocate the first wireless resource to the first relay station and the second relay station; and
designate the first wireless resource as a primary wireless resource for the first relay station and the second relay station.

29. The logic encoded in the non-transitory computer readable medium of claim 27, wherein the logic that, when executed, is operable to determine the probability of the first communication with the first relay station experiencing interference from the second relay station is, when executed, further operable to construct an interference matrix wherein a matrix entry corresponding to the probability of the first communication with the first relay station experiencing interference from a second relay station comprises a 1 if the probability of experiencing interference from the second relay station is greater than an interference threshold and a 0 if the probability of experiencing interference from the second relay station is less than an interference threshold.

30. The logic encoded in the non-transitory computer readable medium of claim 27 wherein:
the logic, when executed, is further operable to receive traffic demand data from the first relay station and the second relay station; and
wherein the logic that, when executed, is operable to allocate a first wireless resource to the first relay station and the second relay station is, when executed, further operable to allocate a first wireless resource to the first relay station and the second relay station based on the traffic demand data from the first relay station and the second relay station;
wherein the logic that, when executed, is operable to designate the first wireless resource as a primary wireless resource for the first relay station is, when executed, further operable to designate the first wireless resource as a primary wireless resource for the first relay station based on the traffic demand data from the first relay station and the second relay station;
wherein the logic that, when executed, is operable to designate the first wireless resource as a secondary wireless resource for the second relay station is, when executed, further operable to designate the first wireless resource as a secondary wireless resource for the second relay station based on the traffic demand data from the first relay station and the second relay station;
wherein the logic that, when executed, is operable to allocate a second wireless resource to the second relay station is, when executed, further operable to allocate a second wireless resource to the second relay station based on the traffic demand data from the first relay station and the second relay station; and
wherein the logic that, when executed, is operable to designate the second wireless resource as a primary wireless resource for the second relay station is, when executed, further operable to designate the second wireless resource as a primary wireless resource for the second relay station based on the traffic demand data from the first relay station and the second relay station.

31. Logic encoded in a non-transitory computer readable medium that when executed is operable to:
receive at a relay station a wireless resource designation message from a base station, the wireless resource designation message designating:
a first wireless resource to be used as a primary wireless resource; and
a second wireless resource to be used as a secondary wireless resource, wherein the secondary wireless resource is configured to be used by the relay station until another relay station using the second wireless resource experiences interference from the relay station, the second wireless resource also being used by a proximate relay station;
establish a first wireless connection with an endpoint using the second wireless resource; and
upon detecting interference from the proximate relay station using the second wireless resource with the first wireless connection with the endpoint using the second wireless resource, establish a second wireless connection with the endpoint using the primary wireless resource while the proximate relay station continues to use the second wireless resource.

32. The logic encoded in the non-transitory computer readable medium of claim 31, wherein detecting interference from the proximate relay station with the first wireless connection with the endpoint using the second wireless resource comprises the logic, when executed, being further operable to receive from the endpoint a first number of requests for retransmission within a first amount of time.

33. The logic encoded in the non-transitory computer readable medium of claim 31, wherein detecting interference from the proximate relay station with the first wireless connection with the endpoint using the second wireless resource comprises the logic, when executed, being further operable to:
send the endpoint a request for a signal quality report; and
receive from the endpoint the signal quality report.

34. A system for reusing wireless resources in a wireless network, comprising:

means for determining the probability of a first communication with a first relay station experiencing interference from a second relay station;
means for, upon determining that the probability of experiencing interference from the second relay station is greater than an interference threshold:
   allocating a first wireless resource to the first relay station and the second relay station;
   designating the first wireless resource as a primary wireless resource for the first relay station;
   designating the first wireless resource as a secondary wireless resource for the second relay station wherein the secondary wireless resource is configured to be used by the second relay station until the first relay station experiences interference from the second relay station;
   allocating a second wireless resource to the second relay station; and
   designating the second wireless resource as a primary wireless resource for the second relay station.

35. A system for reusing resources in a wireless network, comprising:
means for receiving at a relay station a wireless resource designation message—from a base station, the wireless resource designation message designating:
   a first wireless resource to be used as a primary wireless resource; and
   a second wireless resource to be used as a secondary wireless resource, wherein the secondary wireless resource is configured to be used by the relay station until another relay station using the second wireless resource experiences interference from the relay station, the second wireless resource also being used by a proximate relay station;
means for establishing a first wireless connection with an endpoint using the second wireless resource; and
means for, upon detecting interference from the proximate relay station using the second wireless resource with the first wireless connection with the endpoint using the second wireless resource, establishing a second wireless connection with the endpoint using the primary wireless resource while the proximate relay station continues to use the second wireless resource.

* * * * *